United States Patent
Kousaka et al.

(10) Patent No.: US 8,998,214 B2
(45) Date of Patent: Apr. 7, 2015

(54) SEALING METHOD AND SEAL MEMBER

(75) Inventors: Takumi Kousaka, Osaka (JP); Takashi Tamura, Osaka (JP); Junji Asano, Aichi (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/698,954

(22) PCT Filed: May 24, 2011

(86) PCT No.: PCT/JP2011/061793
§ 371 (c)(1),
(2), (4) Date: Nov. 19, 2012

(87) PCT Pub. No.: WO2011/148911
PCT Pub. Date: Dec. 1, 2011

(65) Prior Publication Data
US 2013/0075974 A1     Mar. 28, 2013

(30) Foreign Application Priority Data
May 26, 2010   (JP) .................................. 2010-121006

(51) Int. Cl.
*F16L 17/00*   (2006.01)
*F16J 15/02*   (2006.01)
*C09K 3/10*    (2006.01)
(Continued)

(52) U.S. Cl.
CPC . *F16J 15/02* (2013.01); *C09K 3/10* (2013.01); *F16L 5/02* (2013.01); *F24F 2007/003* (2013.01)

(58) Field of Classification Search
CPC ..... F16J 15/0887; F16J 15/061; F16L 17/035

USPC .................................. 277/602, 616, 630, 637
See application file for complete search history.

(56) References Cited

U.S. PATENT DOCUMENTS

D372,074 S  *  7/1996  Wallace et al. .............. D23/269

FOREIGN PATENT DOCUMENTS

CN         85202500 U       9/1986
CN         85103952 A      11/1986
(Continued)

OTHER PUBLICATIONS

First Office Action issued by SIPO on Feb. 28, 2014, in connection with corresponding Chinese Patent Application No. 201180022760.7.

(Continued)

*Primary Examiner* — Gilbert Lee
(74) *Attorney, Agent, or Firm* — Jean C. Edwards, Esq; Edwards Neils PLLC

(57) ABSTRACT

A sealing method is for sealing a gap between an opening section extending through a wall in a thickness direction thereof and an insertion member inserted in the opening section, and includes a seal-member preparing step of preparing a seal member including an elastic layer, an adhesive layer laminated on a surface of the elastic layer, and a release sheet laminated on a surface of the adhesive layer, and formed with a through hole into which the insertion member is to be inserted along a direction of lamination thereof, an inserting step of inserting the insertion member into the through hole such that the insertion member comes in contact with the seal member to bring the release sheet into abutment with the wall, and a sticking step of sticking the seal member to the insertion member and the wall, while peeling the release sheet from the adhesive layer.

6 Claims, 8 Drawing Sheets

(51) Int. Cl.
  *F16L 5/02* (2006.01)
  *F24F 7/00* (2006.01)

(56) References Cited

FOREIGN PATENT DOCUMENTS

| CN | 1851185 A | 10/2006 |
| CN | 2009-064632 Y | 10/2007 |
| JP | 61-094679 U | 6/1986 |
| JP | 61-094681 U | 6/1986 |
| JP | 05-078715 U | 10/1993 |
| JP | 3014359 U | 5/1995 |
| JP | 07-279268 A | 10/1995 |
| JP | 2005-126521 A | 5/2005 |

OTHER PUBLICATIONS

Notification of Reasons for Refusal issued by JPO on Apr. 15, 2014, in connection with corresponding Japanese Patent Application No. 2010-121006.

* cited by examiner

FIG.11
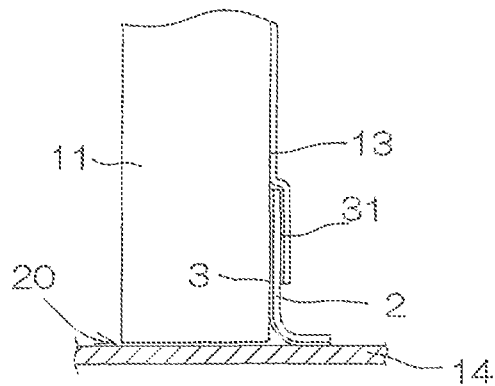
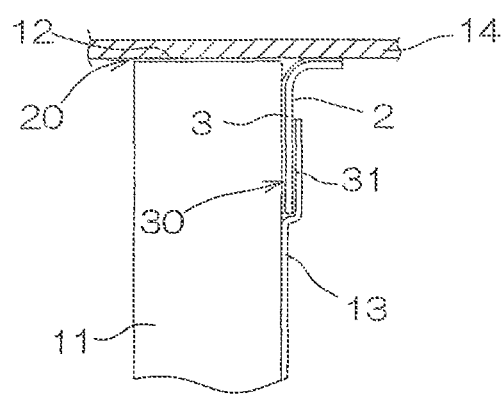

SEALING METHOD AND SEAL MEMBER

CROSS-REFERENCE TO RELATED APPLICATIONS

The present invention is a 35 U.S.C. 371 National Stage Entry of PCT/JP2011/061793, filed May 24, 2011, which claims priority from Japanese Patent Application Nos. 2010-121006, filed on May 26, 2010, the contents of both of which are herein incorporated by reference.

TECHNICAL FIELD

The present invention relates to a sealing method and a seal member, and particularly to a sealing method used appropriately to seal the gap between an opening section in an outer wall and an insertion member and a seal member used in the method.

BACKGROUND ART

Conventionally, it has been well known to form the outer wall of a building or the like with an opening section (through hole) extending therethrough in the thickness direction thereof, and insert a duct (conduit tube) in the opening section to provide communication between the inside and outside of the building via the duct and achieve ventilation of the building or the like.

However, between the inner peripheral surface of the opening section and the outer peripheral surface of the duct, a gap is likely to be formed, and water may intrude into the building from the outside thereof via the gap.

To prevent such water intrusion, a method has been proposed in which, e.g., an adhesive tape having a specified elongation or deforming stress is stuck to the duct in such a manner as to be wound therearound and also stuck to the outer wall around the opening section to seal the gap between the opening section and the duct (see, e.g., Patent Document 1 shown below).

PRIOR ART DOCUMENT

Patent Document

Patent Document: 1 Japanese Unexamined Patent No. 2005-126521

SUMMARY OF THE INVENTION

Problem to be Solved by the Invention

However, in Patent Document 1 shown above, the adhesive tape has an elongation so that, when the adhesive tape is stuck, the degree to which a user pulls the adhesive tape varies. This may vary the degree to which the adhesive tape elongates/contracts when the adhesive tape is stuck to the duct and the outer wall.

Therefore, to uniformly stick the adhesive tape to the duct and the outer wall so as not to form a gap therebetween, some skill is required.

It is therefore an object of the present invention to provide a sealing method which allows the gap between an opening section extending through a wall in the thickness direction thereof and an insertion member inserted in the opening section to be sealed easily and stably with a simple configuration, and a seal member used in the sealing method.

Means for Solving the Problem

A sealing method of the present invention is for sealing a gap between an opening section extending through a wall in a thickness direction thereof and an insertion member inserted in the opening section and includes a seal-member preparing step of preparing a seal member including an elastic layer, an adhesive layer laminated on a surface of the elastic layer, and a release sheet laminated on a surface of the adhesive layer, and formed with a through hole into which the insertion member is to be inserted along a direction of lamination thereof, an inserting step of inserting the insertion member into the through hole such that the insertion member comes in contact with the seal member to bring the release sheet into abutment with the wall, and a sticking step of sticking the seal member to the insertion member and the wall, while peeling the release sheet from the adhesive layer.

According to the method, in the inserting step, the insertion member is inserted into the through hole formed in the seal member so as to come in contact with the seal member to bring the release sheet into abutment with the wall.

That is, in the inserting step, the seal member is brought into abutment with each of the insertion member and the wall. Then, in a state where the seal member is in abutment with each of the insertion member and the wall, the seal member is stuck to the insertion member and the wall, while the release sheet is peeled from the adhesive layer.

Accordingly, in the inserting step, to enable the gap between the opening section and the insertion member to be sealed, the seal member is brought into a position in which it is in abutment with each of the insertion member and the wall. While the position is maintained, in the sticking step, the release sheet is peeled from the adhesive layer and the seal member is stuck to the insertion member and the wall to enable the gap between the opening section and the insertion member to be sealed.

Thus, with a simple configuration, the gap between the opening section extending through the wall in the thickness direction thereof and the insertion member inserted in the opening section can be sealed easily and stably.

In the sealing method of the present invention, it is preferable that the release sheet includes a first peel-off portion provided along a peripheral edge portion of the through hole, and a second peel-off portion provided in a portion other than the first peel-off portion, and, in the sticking step, the seal member is stuck to at least the insertion member while the first peel-off portion is peeled, and the seal member is stuck to at least the wall while the second peel-off portion is peeled.

According to the method, the release sheet includes the first peel-off portion and the second peel-off portion. In the sticking step, when the seal member is stuck to the insertion member, the first peel-off portion is peeled and, when the seal member is stuck to the wall, the second peel-off portion is peeled.

Therefore, in the sticking step, the first peel-off portion and the second peel-off portion can be peeled individually to allow the release sheet to be easily peeled, and the seal member can be reliably stuck to each of the insertion member and the wall.

As a result, it is possible to more stably seal the gap between the opening section extending through the wall in the thickness direction thereof and the insertion member inserted in the opening section.

In the sealing method of the present invention, it is preferable that the seal member further includes a first pull portion to be pulled when the first peel-off portion is peeled and a second pull portion to be pulled when the second peel-off portion is peeled, and, in the sticking step, the first pull portion is pulled to peel the first peel-off portion and the second pull portion is pulled to peel the second peel-off portion.

According to the method, by pulling the first pull portion and the second portion, the first peel-off portion and the second peel-off portion can be peeled, and the first peel-off portion and the second peel-off portion can be easily peeled.

In the sealing method of the present invention, it is preferable that the first pull portion is provided so as to protrude from the first peel-off portion toward the through hole, and the second pull portion is provided so as to protrude from the second peel-off portion toward the opposite side of the through hole.

According to the method, the first pull portion and the second pull portion are formed so as to protrude. Therefore, it is possible to easily hold the first pull portion and the second pull portion and reliably pull them.

A seal member of the present invention is used for sealing a gap between an opening section extending through a wall in a thickness direction thereof and an insertion member inserted in the opening section and includes an elastic layer, an adhesive layer laminated on a surface of the elastic layer, and a release sheet laminated on a surface of the adhesive layer, wherein a through hole into which the insertion member is to be inserted is formed along a direction of lamination thereof in a penetrating manner.

According to such a configuration, along the direction of lamination of the elastic layer, the adhesive layer, and the release sheet, the through hole into which the insertion member is to be inserted is formed in the penetrating manner.

Therefore, the insertion member is inserted in the through hole so as to bring the seal member into abutment with each of the insertion member and the wall and, in the state where the seal member is in abutment with each of the insertion member and the wall, the seal member can be stuck to the insertion member and the wall, while the release sheet is peeled from the adhesive layer.

That is, to enable the gap between the opening section and the insertion member to be sealed, the seal member is brought into a position in which it is in abutment with each of the insertion member and the wall. While the position is maintained, in the sticking step, the release sheet is peeled from the adhesive layer, and the seal member is stuck to the insertion member and the wall to enable the gap between the opening section and the insertion member to be sealed.

Thus, with a simple configuration, the gap between the opening section extending through the wall in the thickness direction thereof and the insertion member inserted in the opening section can be sealed easily and stably.

In the seal member of the present invention, it is preferable that the release sheet includes a first peel-off portion provided along a peripheral edge portion of the through hole, and a second peel-off portion provided in a portion other than the first peel-off portion.

According to such a configuration, the release sheet includes the first peel-off portion and the second peel-off portion.

Therefore, when the release sheet is peeled, the first peel-off portion and the second peel-off portion can be peeled individually to allow the release sheet to be easily peeled, and the seal member can be reliably stuck to each of the insertion member and the wall.

As a result, it is possible to more stably seal the gap between the opening section extending through the wall in the thickness direction thereof and the insertion member inserted in the opening section.

It is preferable that the seal member of the present invention further includes a first pull portion to be pulled when the first peel-off portion is peeled, and a second pull portion to be pulled when the second peel-off portion is peeled.

According to such a configuration, by pulling the first pull portion and the second portion, the first peel-off portion and the second peel-off portion can be peeled, and the first peel-off portion and the second peel-off portion can be easily peeled.

Effect of the Invention

According to the sealing method and the seal member of the present invention, to enable the gap between the opening section and the insertion member to be sealed, the seal member is brought into a position in which it is in abutment with each of the insertion member and the wall. While the position is maintained, the release sheet is peeled from the adhesive layer, and the seal member is stuck to the insertion member and the wall to enable the gap between the opening section and the insertion member to be sealed.

Thus, with a simple configuration, the gap between the opening section extending through the wall in the thickness direction thereof and the insertion member inserted in the opening section can be sealed easily and stably.

BRIEF DESCRIPTION OF THE DRAWINGS

FIG. 11 is an illustrative view for illustrating the sealing method shown in FIG. 10 and shows a cross-sectional view of the state where the sticking of the seal member is completed.

EMBODIMENT OF THE INVENTION

Figure 1:
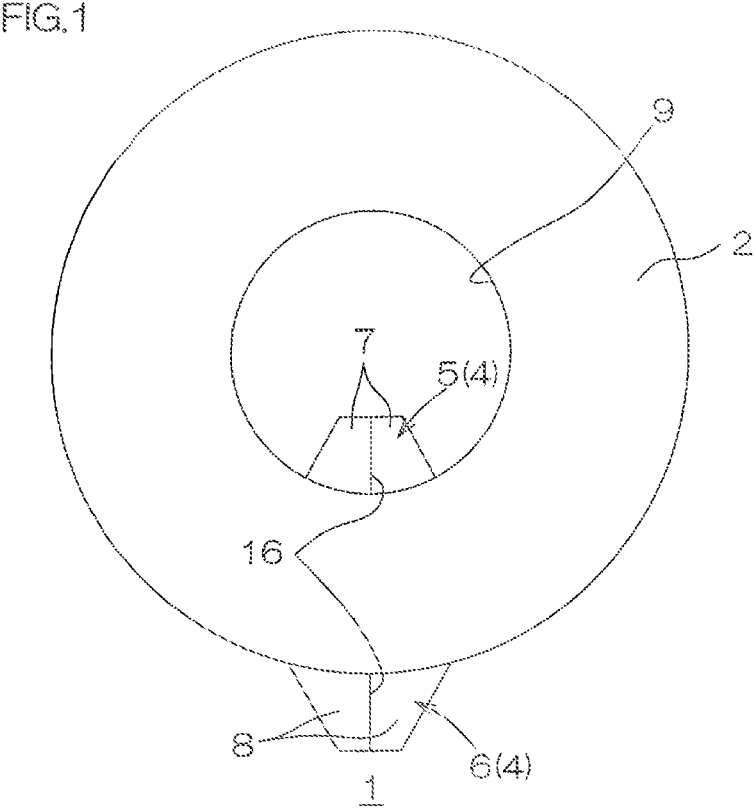
FIG. 1 is a plan view showing an embodiment of a seal member of the present invention.
Figure 2:
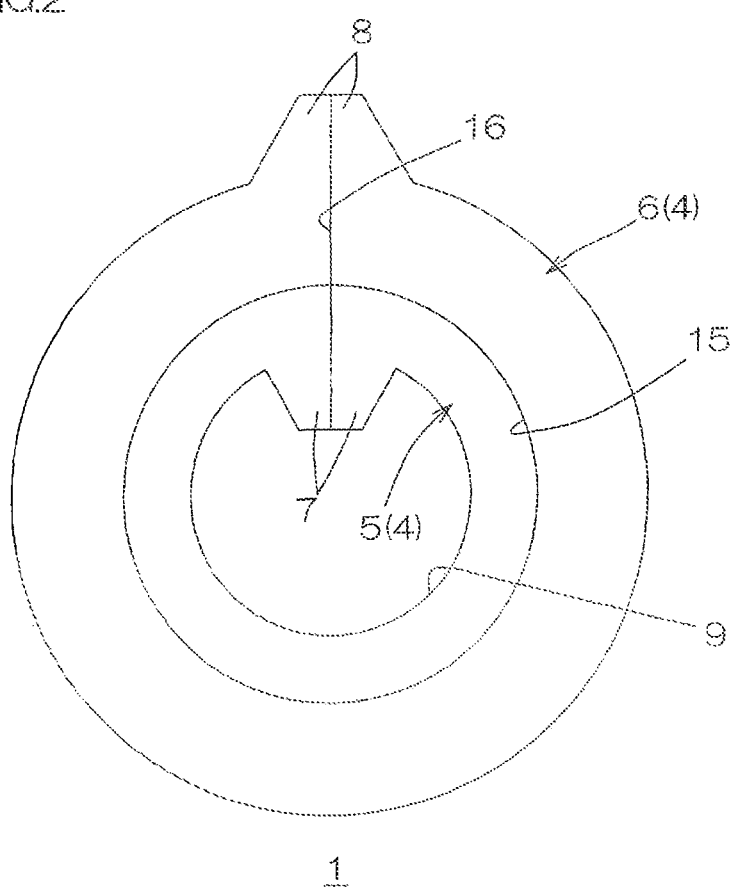
FIG. 2 is a bottom view of the seal member shown in FIG. 1.
Figure 3:
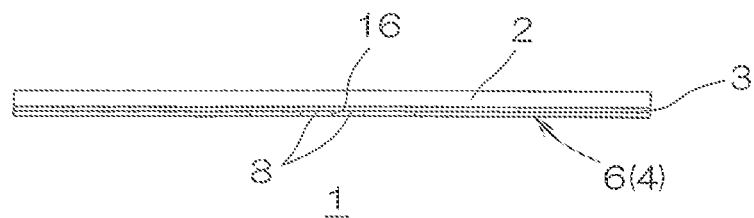
FIG. 3 is a front view of the seal member shown in FIG. 1.
Figure 4:
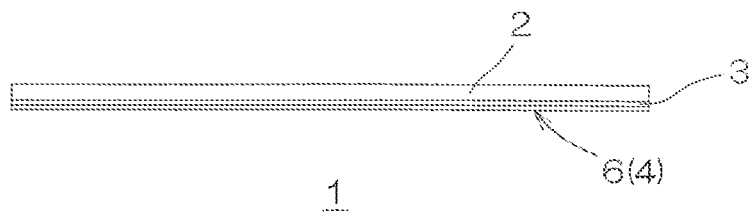
FIG. 4 is a rear view of the seal member shown in FIG. 1.
Figure 5:
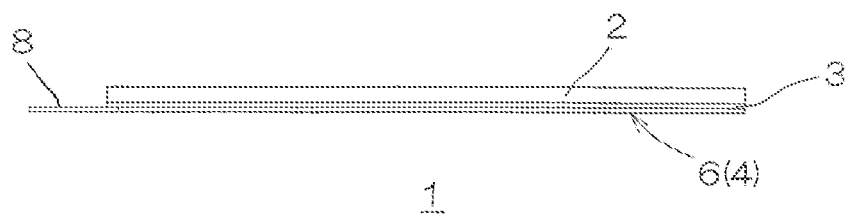
FIG. 5 is a right side view of the seal member shown in FIG. 1.
Figure 6:
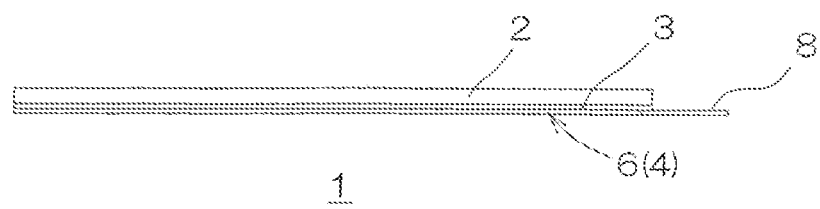
FIG. 6 is a left side view of the seal member shown in FIG. 1.

FIG. 1 is a plan view showing an embodiment of a seal member of the present invention. FIG. 2 is a bottom view of the seal member shown in FIG. 1. FIG. 3 is a front view of the seal member shown in FIG. 1. FIG. 4 is a rear view of the seal member shown in FIG. 1. FIG. 5 is a right side view of the seal member shown in FIG. 1. FIG. 6 is a left side view of the seal member shown in FIG. 1.

As shown in FIG. 1, a seal member 1 is formed in a generally circular shape in plan view (i.e., generally annular shape in plan view) having a through hole 9 formed in the center thereof to allow a duct 14 (described later) to be inserted therethrough. Note that, when a direction is mentioned in the description of the seal member 1, in the direction of lamination of an elastic layer 2 (described later), an adhesive layer 3 (described later), and a release sheet 4 (described later), a side on which the elastic layer 2 (described later) is laminated (i.e., upper side along the paper surface with FIG. 3) is defined as one side and a side on which the release sheet 4 (described later) is laminated (i.e., lower side along the paper surface with FIG. 3) is defined as the other side.

The through hole 9 is formed in a generally circular shape in plan view having a diameter smaller than the outer diameter of the duct 14 (described later).

As shown in FIG. 3, the seal member 1 includes the elastic layer 2, the adhesive layer 3 laminated on the other surface of the elastic layer 2 in the direction of lamination, and the release sheet 4 laminated on the other surface of the adhesive layer 3 in the direction of lamination.

The elastic layer 2 is formed of, e.g., an elastic material having a shock-absorbing (cushioning) function and a watertight function into a generally annular shape in plan view corresponding to the outer shape of the seal member 1.

Examples of a material for forming the elastic layer 2 include ethylene-propylene-diene rubber (EPDM), α-olefin dicyclopentadiene such as 1-butene, a rubber-based copolymer containing cyclic or non-cyclic polyene having a non-conjugated double bond such as ethylidene norbornene, and various rubbers such as ethylene-propylene rubber, ethylene-propylene terpolymer, silicone rubber, polyurethane-based rubber, polyamide-based rubber, natural rubber, polyisobutylene, polyisoprene, chloroprene rubber, butyl rubber, nitrile butyl rubber, styrene-butadiene rubber, styrene-butadiene-styrene rubber, styrene-isoprene-styrene rubber, styrene-ethylene-butadiene rubber, styrene-ethylene-butylene-styrene rubber, styrene-isoprene-propylene-styrene rubber, and acrylic rubber. Preferably, in terms of weathering resistance, the EPDM is used.

The elastic layer 2 can be obtained as a foam by heating a foaming composition containing the material shown above and a known foaming agent (as necessary, known additives such as a known cross-linking agent, a vulcanization accelerator, a softener, a filler, and a foaming auxiliary agent) to cause foaming and cross-linking thereof.

The thickness of the elastic layer 2 is in a range of, e.g., 0.5 to 30 mm, or preferably 2 to 15 mm.

The apparent density of the elastic layer 2 is in a range of, e.g., 0.01 to 0.5 $g/cm^3$, or preferably 0.05 to 0.25 $g/cm^3$.

When the elastic layer 2 is obtained as the foam, the expansion ratio (volume expansion ratio) of the elastic layer 2 is in a range of, e.g., 1.1 to 25 times, or preferably 1.5 to 20 times.

The adhesive layer 3 is formed of, e.g., an adhesive composition having a watertight function into a generally annular shape in plan view corresponding to the outer shape of the seal member 1 so as to cover the entire surface of the elastic layer 2.

Examples of the adhesive composition forming the adhesive layer 3 include a rubber-based adhesive composition, a resin-based adhesive composition, and the like.

The rubber-based adhesive composition contains a rubber such as, e.g., butyl rubber, polyisobutylene, or rubber asphalt as a main component thereof.

As the resin-based adhesive composition, an acrylic-based adhesive composition, a silicone-based adhesive composition, a polyurethane-based adhesive composition, a polyester-based adhesive composition, or the like can be used.

As the adhesive, the rubber-based adhesive composition is used preferably or, more preferably, a rubber-based adhesive composition containing butyl rubber is used in terms of weathering resistance.

As necessary, the adhesive composition contains, e.g., a known tackifier, a known filler, and a known softener.

The thickness of the adhesive layer 3 is in a range of, e.g., 10 to 1000 μm, or preferably 100 to 500 μm.

The release sheet 4 is formed of, e.g., a film having elasticity (flexibility) and tenacity (stiffness) into a generally annular shape in plan view corresponding to the outer shape of the seal member 1 so as to cover the entire surface of the adhesive layer 3.

Specific examples of the film forming the release sheet 4 include an olefin-based film such as a polyethylene (PE) film or a polypropylene (PP including oriented polypropylene (OPP)) film and a synthetic resin film such as an ester-based film such as a PET film. Preferably, the olefin-based film is used.

The surface of the release sheet 4 can be subjected to appropriate surface treatment using a release agent such as a silicone-based release agent, a long-chain-alkyl-based release agent, a fluorine-based release agent, or molybdenum sulfide.

As the release sheet 4, the synthetic resin film mentioned above can be used as a single layer, or a plurality of the synthetic resin films mentioned above can be stacked to be used as a laminate film. Examples of such a laminate film include a laminate film including a PE film and an OPP film laminated on the surface thereof, a laminate film including a PE film and a polyester film laminated on the surface thereof, and the like.

The thickness of the release sheet 4 is in a range of, e.g., 50 to 500 μm, preferably 75 to 400 μm, or more preferably 100 to 300 μm.

The tensile strength (JIS K 7113) of the release sheet 4 is in a range of, e.g., not less than 10 MPa, preferably not less than 50 MPa, or more preferably not less than 100 MPa and normally not more than 500 MPa. When the tensile strength of the release sheet 4 is not within the foregoing ranges, in a sticking step (described later), the release sheet 4 may be broken, and the broken release sheet 4 may remain between the adhesive layer 3 and a wall 11 or the duct 14.

As shown in FIG. 2, in the release sheet 4, between the inner peripheral edge and the outer peripheral edge thereof, a first cut 15 in a generally circular shape in bottom view having a center thereof common to that of the through hole 9 is formed. This has divided the release sheet 4 in the radial direction of the seal member 1 into a radially inner first peel-off portion 5 and a radially outer second peel-off portion 6.

The diameter of the first cut 15 is appropriately set in accordance with the diameter of the duct 14 (described later). More specifically, the diameter of the first cut 15 is set to, e.g., 100 to 130%, or preferably 110 to 120% of the diameter of the duct 14 (described later).

If the diameter of the first cut 15 is within the foregoing ranges, in an inserting step (described later), the radially inner portion of the seal member 1 corresponding to the first peel-off portion 5 can be raised from the radially outer portion of the seal member 1 corresponding to the second peel-off portion 6 along the outer circumference of the duct 14 and, in the sticking step (described later), the first peel-off portion 5 and the second peel-off portion 6 can be easily peeled.

The first peel-off portion 5 is formed along the peripheral edge portion of the through hole 9 to have a generally annular shape in bottom view corresponding to the radially inner half portion of the seal member 1. Also, the first peel-off portion 5 includes a first pull portion 7.

The first pull portion 7 is formed in a generally trapezoidal shape in plan view protruding from the radially inner end edge of the first peel-off portion 5 into the through hole 9, i.e., in a radially inward direction.

The second peel-off portion 6 is formed around the first peel-off portion 5 to have a generally annular shape in bottom view corresponding to the radially outer half portion of the seal member 1. Also, the second peel-off portion 6 includes a second pull portion 8.

The second pull portion 8 is disposed on the opposite side of the first pull portion 7 in the radial direction and formed in a generally trapezoidal shape in plan view protruding from the radially outer end edge of the second peel-off portion 6 toward the opposite side of the through hole 9 (i.e., in a radially outward direction).

In the release sheet 4, a second cut 16 having a generally linear shape in bottom view along the radial direction is formed so as to pass through the middle of each of the first pull portion 7 and the second pull portion 8 in a circumferential direction and extend between the radially inner end edge of the first pull portion 7 and the radially outer end edge of the second pull portion 8.

Thus, the release sheet 4 is circumferentially cut in the portion where the second cut 16 is formed. Also, the first pull portion 7 and the second pull portion 8 are circumferentially halved.

To form the seal member 1, the elastic layer 2 is formed first on a predetermined base material. Meanwhile, the adhesive layer 3 is formed on a surface of a predetermined base material. Then, the elastic layer 2 and the adhesive layer 3 are bonded together. Thereafter, the elastic layer 2 and the adhesive layer 3 that have been bonded together are punched into the shape of the seal member 1, and the release sheet 4 formed in advance in a predetermined shape is laminated on the adhesive layer 3.

At this time, in the release sheet 4, the first cut 15 and the second cut 16 are formed. However, the first cut 15 and the second cut 16 are formed so as not to affect the adhesive layer 3 (so as not to, e.g., form cuts corresponding to the first cut 15 and the second cut 16 in the adhesive layer 3). For example, the release sheet 4 in which the first cut 15 and the second cut 16 are formed in advance is formed and laminated on the adhesive layer 3.

Next, a sealing method using the seal member 1 is described.

Figure 7:
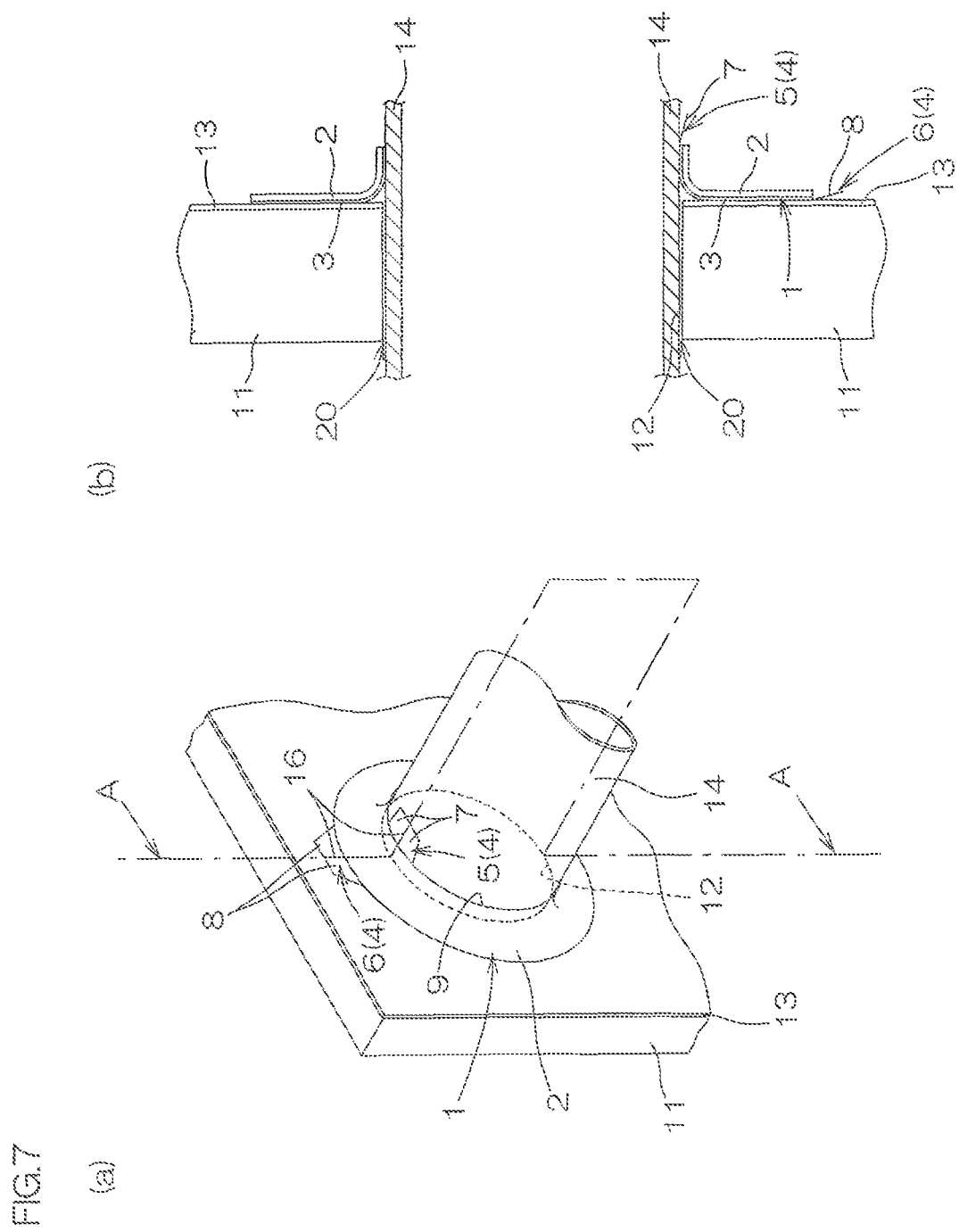
FIG. 7 is an illustrative view for illustrating an embodiment of a sealing method of the present invention and shows an inserting step,
  (a) showing a perspective view, and
  (b) showing an A-A cross-sectional view.
Figure 8:
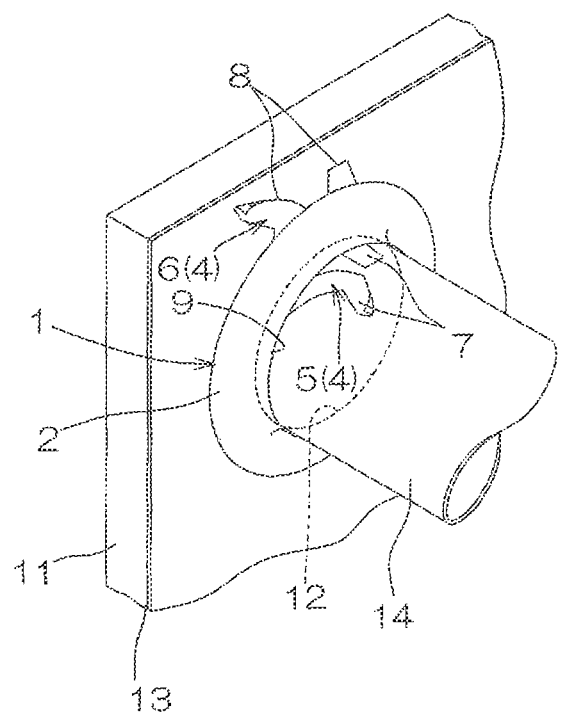
FIG. 8 is an illustrative view for illustrating the sealing method shown in FIG. 7, which is a perspective view showing a sticking step.
Figure 9:
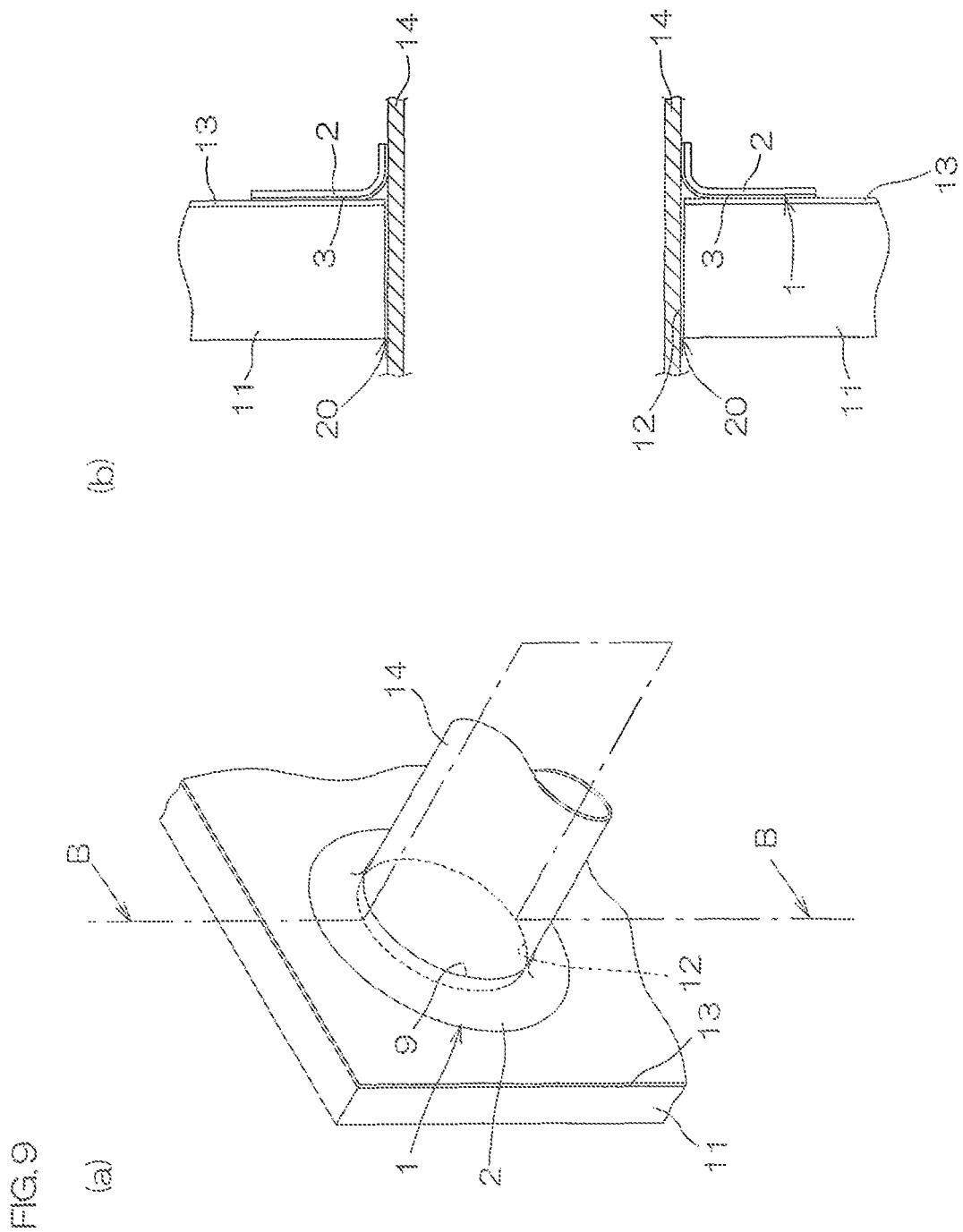
FIG. 9 is an illustrative view for illustrating the sealing method shown in FIG. 7 and shows a state where the sticking of the seal member is completed,
  (a) showing a perspective view, and
  (b) showing a B-B cross-sectional view.

FIG. 7 is an illustrative view for illustrating an embodiment of the sealing method of the present invention and shows the inserting step, (a) showing a perspective view, and (b) showing an A-A cross-sectional view. FIG. 8 is an illustrative view for illustrating the sealing method shown in FIG. 7, which is a perspective view showing the sticking step. FIG. 9 is an illustrative view for illustrating the sealing method shown in FIG. 7 and shows a state where the seal member has been stuck, (a) showing a perspective view, and (b) showing a B-B cross-sectional view.

As shown in FIG. 9(a), the seal member 1 is used to seal a gap 20 (described later) between the wall 11 and the duct 14 as an insertion member.

The wall 11 is typically the outer wall of a building such as a house. In the wall 11, a generally cylindrical opening section 12 is formed to extend therethrough along the thickness direction thereof. The opening section 12 is formed to have a diameter larger than the diameter of the through hole 9 of the seal member 1.

Note that, over the wall 11, a waterproof sheet 13 for preventing moisture from being attached to the wall 11 is provided so as to cover the entire surface of the wall 11.

The duct 14 is formed in a generally cylindrical shape extending in the thickness direction of the wall 11. The duct 14 is formed to have an outer diameter slightly smaller than the diameter of the opening section 12.

Through the opening section 12 of the wall 11, the duct 14 is inserted, and the gap 20 is formed between the inner circumferential surface of the wall 11 and the outer circumferential surface of the duct 14.

In the method, the seal member 1 described above is prepared first (seal-member preparing step).

Next, in the method, as shown in FIG. 7(a), the duct 14 is inserted into the through hole 9 of the seal member 1 so as to bring the release sheet 4 of the seal member 1 into abutment with the wall 11 (inserting step).

Specifically, the seal member 1 is positioned relative to the duct 14 such that the release sheet 14 faces the front end (free end portion protruding from the wall 11 and not shown) of the duct 14 and the through hole 9 and the front end of the duct 14 overlap each other when projected in the direction of lamination.

Thereafter, the seal member 1 is pushed toward the other side in the direction of lamination so as to press-fit the duct 14 into the through hole 9. This brings the inner circumferential end surface of the first peel-off portion 5 into abutment with the outer circumferential end surface of the front end of the duct 14.

When the seal member 1 is further pushed toward the other side in the direction of lamination, the radially inner portion of the seal member 1 corresponding to the first peel-off portion 5 is pressed by the outer circumferential end surface of the front end of the duct 14 toward one side in the direction of lamination to be bent so as to rise toward one side in the direction of lamination.

At this time, the radially inner portion of the seal member 1 is press-opened against the elasticity of the elastic layer 2 and the adhesive layer 3 so as to follow the outer circumferential surface of the duct 14.

Also, as shown in FIG. 7(b), in the radially inner portion of the seal member 1, the first peel-off portion 5 of the release sheet 4 and the outer circumferential surface of the duct 14 are brought into contact with each other. As a result, when the seal member 1 is pushed toward the other side in the direction of lamination, it is possible to slidably rub the release sheet 14 against the duct 14 and smoothly push the seal member 1.

Then, the seal member 1 is pushed till the radially outer portion of the seal member 1 corresponding to the second peel-off portion 6 is brought into abutment with the waterproof sheet 13 of the wall 11.

Consequently, the second peel-off portion 6 of the release sheet 4 is brought into abutment with the waterproof sheet 13 of the wall 11.

Next, in the method, as shown in FIG. 8, the radially inner portion of the seal member 1 is stuck to the duct 14, while the first peel-off portion 5 is peeled, and also the radially outer portion of the seal member 1 is stuck to the waterproof sheet 13 of the wall 11, while the second peel-off portion 6 is peeled.

Specifically, the first pull portion 7 on one side in the circumferential direction is pulled in the axial direction of the duct 14 to peel one circumferential end portion of the first peel-off portion 5 from the adhesive layer 3.

Thereafter, the first pull portion 7 is further pulled from one side to the other side in the circumferential direction so as to move around the duct 14 once to peel the first peel-off portion 5 from the adhesive layer 3 throughout the entire circumferential direction.

This sequentially exposes the adhesive layer 3 to the outer circumferential surface of the duct 14, and the exposed adhesive layer 3 is sequentially stuck to the outer circumferential surface of the duct 4.

Then, the second pull portion 8 on one side in the circumferential direction is pulled along the wall 1 to peel one circumferential end portion of the second peel-off portion 6 from the adhesive layer 3.

Thereafter, the second pull portion 8 is pulled from one side to the other side in the circumferential direction so as to move around the duct 14 once to peel the second peel-off portion 6 from the adhesive layer 3 throughout the entire circumferential direction.

This sequentially exposes the adhesive layer 3 to the surface of the waterproof sheet 13, and the exposed adhesive layer 3 is sequentially stuck to the surface of the waterproof sheet 13.

Note that, to peel the release sheet 4 from the adhesive layer 3, it is also possible to pull the first pull portion 7 and the second pull portion 8 on the other side in the circumferential direction. In that case, after the other circumferential end portion is peeled, the first pull portion 7 and the second pull portion 8 are pulled from the other side to one side in the circumferential direction so as to move around the duct 14 once.

As a result, as shown in FIGS. 9(a) and 9(b), the radially inner portion of the seal member 1 and the outer circumferential surface of the duct 14 are bought into close contact with each other throughout the entire circumferential direction of the duct 14 while, along the peripheral edge portion of the opening section 12, the radially outer portion of the seal member 1 and the waterproof sheet 13 are brought into close contact with each other throughout the entire circumferential direction of the opening section 12.

Thus, the sealing of the gap 20 between the wall 11 and the duct 14 is completed.

According to the sealing method and the seal member 1, as shown in FIG. 8, in the inserting step, the duct 14 is inserted into the through hole 9 formed in the seal member 1 so as to come in contact with the seal member 1 and bring the release sheet 4 into abutment with the wall 11.

That is, in the inserting step, the seal member 1 is brought into abutment with each of the duct 14 and the wall 11. Then, in a state where the seal member 1 is in abutment with each of the duct 14 and the wall 11, the seal member 1 is stuck to the duct 14 and the wall 11, while the release sheet 4 is peeled from the adhesive layer 3.

Therefore, in the inserting step, to enable the gap 20 between the opening section 12 and the duct 14 to be sealed, the seal member 1 is brought into a position in which it is in abutment with each of the duct 14 and the wall 11. While the position is maintained, in the sticking step, the release sheet 4 is peeled from the adhesive layer 3, and the seal member 1 is stuck to the duct 14 and the wall 11 to enable the gap 20 between the opening section 12 and the duct 14 to be sealed.

Thus, with a simple configuration, the gap 20 between the opening section 12 extending through the wall 11 in the thickness direction thereof and the duct 14 inserted in the opening section 12 can be sealed easily and stably.

According to the sealing method and the seal member 1, as shown in FIG. 8, the release sheet 4 includes the first peel-off portion 5 and the second peel-off portion 6. In the sticking step, when the seal member 1 is stuck to the duct 14, the first peel-off portion 5 is peeled and, when the seal member 1 is stuck to the wall 11, the second peel-off portion 6 is peeled.

Therefore, in the sticking step, the first peel-off portion 5 and the second peel-off portion 6 can be individually peeled to allow the release sheet 4 to be easily peeled.

In addition, after the seal member 1 is stuck to either one of the duct 14 and the wall 11, it can be stuck to the other.

This allows the seal member 1 to be reliably stuck to each of the duct 14 and the wall 11.

As a result, it is possible to more stably seal the gap 20 between the opening section 12 extending through the wall 11 in the thickness direction thereof and the duct 14 inserted in the opening section 12.

Also, according to the sealing method and the seal member 1, as shown in FIG. 8, by pulling the first pull portion 7 and the second pull portion 8, the first peel-off portion 5 and the second peel-off portion 6 can be peeled, and the first peel-off portion 5 and the second peel-off portion 6 can be easily peeled.

Also, according to the sealing method and the seal member 1, as shown in FIG. 1, the first pull portion 7 and the second pull portion 8 are formed so as to protrude. Therefore, it is possible to easily hold the first pull portion 7 and the second pull portion 8 and reliably pull them.

Note that, in the embodiment described above, the first peel-off portion 5 is peeled to stick the sheet member 1 to the duct 14, and the second peel-off portion 6 is peeled to stick the sheet member 1 to the wall 11. However, the order in which the first peel-off portion 5 and the second peel-off portion 6 are peeled is not particularly limited. It is also possible to peel the first peel-off portion 5 and then peel the second peel-off portion 6 (i.e., stick the seal member 1 to the duct 14 and then stick the seal member 1 to the wall 11) or peel the second peel-off portion 6 and then peel the first peel-off portion 5 (i.e., stick the seal member 1 to the wall 11 and then stick the seal member 1 to the duct 14). The first peel-off portion 5 and the second peel-off portion can also be peeled simultaneously.

(Modification)

Figure 10:
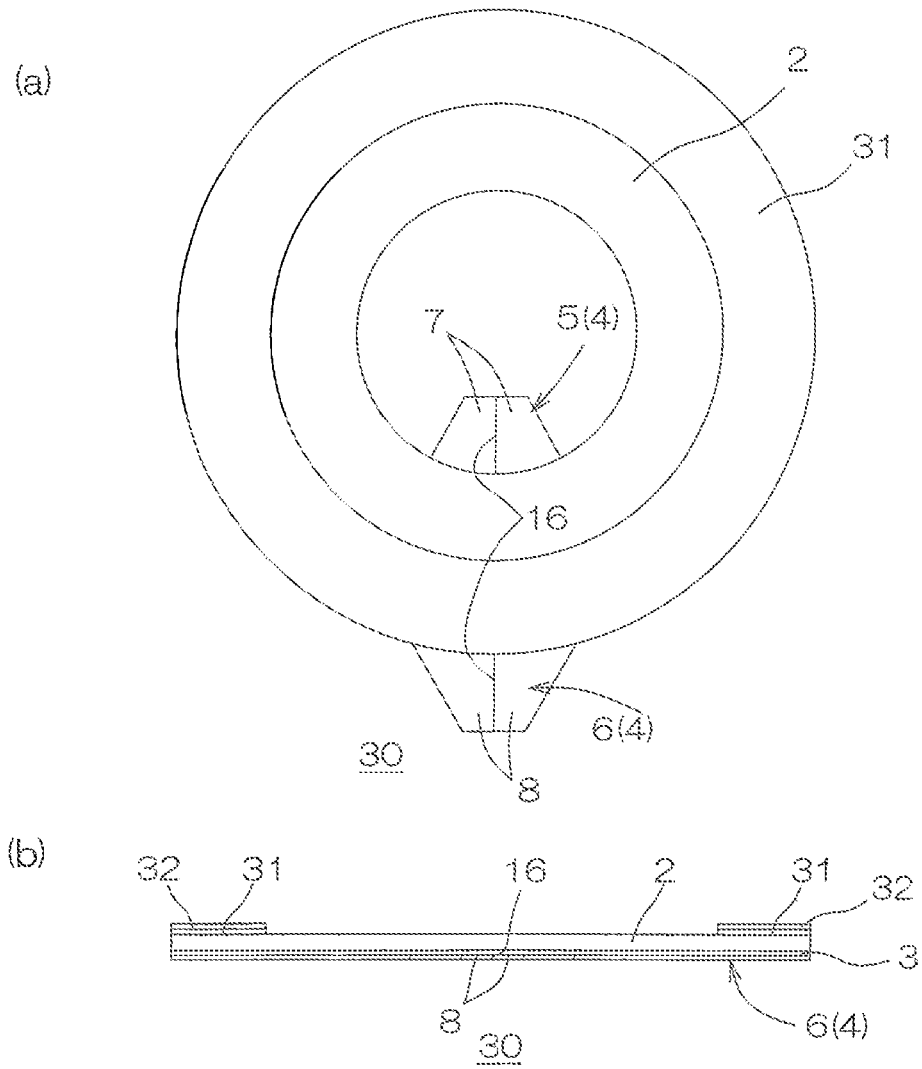
FIG. 10 is an illustrative view for illustrating a modification of the seal member and the sealing method of the present invention,
  (a) showing a plan view of the seal member, and
  (b) showing a front view of the seal member.

FIG. 10 is an illustrative view for illustrating a modification of the seal member and the sealing method of the present invention, (a) showing a plan view of the seal member, and (b) showing a front view of the seal member. FIG. 11 is an illustrative view for illustrating the sealing method shown in FIG. 10 and shows a cross-sectional view of a state where the sticking of the seal member is completed. Note that, in FIGS. 10 and 11, the same members as in the embodiment described above are denoted by the same reference numerals and a description thereof is omitted.

In the embodiment described above, to the wall 11 having the waterproof sheet 13, a seal member 30 is stuck. However, the configuration is not particularly limited. As shown in FIG. 10(c), it may also be possible to stick a seal member 30 to the wall 11 not having the waterproof sheet 13, and then provide the waterproof sheet 13 so as to cover the wall 11 and the seal member 1 therewith.

In that case, as shown in FIGS. 10(a) and 10(b), the seal member 30 includes a waterproof-sheet-side adhesive layer 31 laminated on one surface of the elastic layer 2 in the direction of lamination, and a waterproof-sheet-side release sheet 32 laminated on one surface of the waterproof-sheet-side adhesive layer 31.

The waterproof-sheet-side adhesive layer 31 is formed in a generally annular shape in plan view laminated on the outer half portion of the seal member 30.

The waterproof-sheet-side release sheet 32 is formed in a generally annular shape in plan view corresponding to the waterproof-sheet-side adhesive layer 31.

Then, in the same manner as in the embodiment described above, the seal member 30 is stuck to the wall 11 and the duct 14. Thereafter, the waterproof-sheet-side release sheet 32 is peeled from the waterproof-sheet-side adhesive layer 31 to expose the waterproof-sheet-side adhesive layer 31, and the waterproof sheet 13 is stuck to the waterproof-sheet-side adhesive layer 31.

In the seal member 30 of the modification, the waterproof-sheet-side adhesive layer 31 laminated on one surface of the elastic layer 2 in the direction of lamination is provided. Therefore, it is possible to stick the waterproof sheet 13 to the waterproof-sheet-side adhesive layer 31 and fix the waterproof sheet 13 to the seal member 30.

From the seal member 30 of the modification also, the same function and effect as achieved in the embodiment described above can be obtained.

While the illustrative embodiments of the present invention are provided in the above description, such is for illustrative purpose only and it is not to be construed limitative. Modification and variation of the present invention which will be obvious to those skilled in the art is to be covered by the following claims.

Industrial Applicability

A sealing method and a seal member are used to seal the gap between an opening section in an outer wall and an insertion member.

The invention claimed is:

1. A sealing method for sealing a gap between an opening section extending through a wall in a thickness direction thereof and an insertion member inserted in the opening section, comprising:
   a seal-member preparing step of preparing a seal member including an elastic layer, an adhesive layer laminated on a surface of the elastic layer, and a release sheet laminated on a surface of the adhesive layer, and formed with a through hole into which the insertion member is to be inserted along a direction of lamination thereof;
   an inserting step of inserting the insertion member into the through hole such that the insertion member comes in contact with the seal member to bring the release sheet into abutment with the wall; and
   a sticking step of sticking the seal member to the insertion member and the wall, while peeling the release sheet from the adhesive layer,
   wherein the release sheet includes a radially inner first peel-off portion provided along a peripheral edge portion of the through hole, a radially outer second peel-off portion provided in a portion other than the first peel-off portion, and a first cut that divides the release sheet into the first peel-off portion and the second peel-off portion, and wherein in the sticking step, the seal member is stuck to at least the insertion member while the first peel-off portion is peeled, and the seal member is stuck to at least the wall while the second peel-off portion is peeled.

2. A sealing method according to claim 1, wherein
   the seal member further includes a first pull portion to be pulled when the first peel-off portion is peeled and a second pull portion to be pulled when the second peel-off portion is peeled, and,
   in the sticking step, the first pull portion is pulled to peel the first peel-off portion and the second pull portion is pulled to peel the second peel-off portion.

3. A sealing method according to claim 2, wherein
   the first pull portion is provided so as to protrude from the first peel-off portion toward the through hole, and
   the second pull portion is provided so as to protrude from the second peel-off portion toward the opposite side of the through hole.

4. A seal member used for sealing a gap between an opening section extending through a wall in a thickness direction thereof and an insertion member inserted in the opening section, the seal member comprising:
   an elastic layer;
   an adhesive layer laminated on a surface of the elastic layer; and
   a release sheet laminated on a surface of the adhesive layer,
   wherein a through hole into which the insertion member is to be inserted is formed along a direction of lamination thereof in a penetrating manner, and
   wherein the release sheet includes a radially inner first peel-off portion provided along a peripheral edge portion of the through hole, a radially outer second peel-off portion provided in a portion other than the first peel-off portion, and a first cut that divides the release sheet into the first peel-off portion and the second peel-off portion.

5. A seal member according to claim 4, further comprising:
   a first pull portion to be pulled when the first peel-off portion is peeled; and
   a second pull portion to be pulled when the second peel-off portion is peeled.

6. A seal member according to claim 4, wherein the release sheet includes a second cut extending along a radial direction of the through hole between an inner end edge and an outer end edge of the release sheet.

* * * * *